June 16, 1942.    A. W. HILLS    2,286,737
COLOR SIGNAL FOR SPEEDOMETERS
Filed Aug. 28, 1939    2 Sheets-Sheet 1

Inventor
Arthur W. Hills
By
Blackmore, Spencer & Flint
Attorneys

June 16, 1942.  A. W. HILLS  2,286,737

COLOR SIGNAL FOR SPEEDOMETERS

Filed Aug. 28, 1939 2 Sheets-Sheet 2

Inventor
Arthur W. Hills
By
Blackburn, Spencer & Flint
Attorneys

Patented June 16, 1942

2,286,737

UNITED STATES PATENT OFFICE 2,286,737

COLOR SIGNAL FOR SPEEDOMETERS

Arthur W. Hills, Flushing, Mich., assignor to General Motors Corporation, Detroit, Mich., a corporation of Delaware Application August 28, 1939, Serial No. 292,209

5 Claims. (Cl. 116—129)

This invention relates to speedometers for vehicles and particularly to a speed warning expedient associated with such an instrument.

The object of the invention is to associate with the speed indicating mechanism certain color signals, the colors changing with changing speed ranges whereby the operator is made aware by certain colors of safe car speeds and by a certain change of color that the car speed is entering what may be an excessive range.

A further object is the accomplishment of the major object by mechanism which is simple and inexpensive.

Other objects will be understood from the description which follows.

Figure 1:
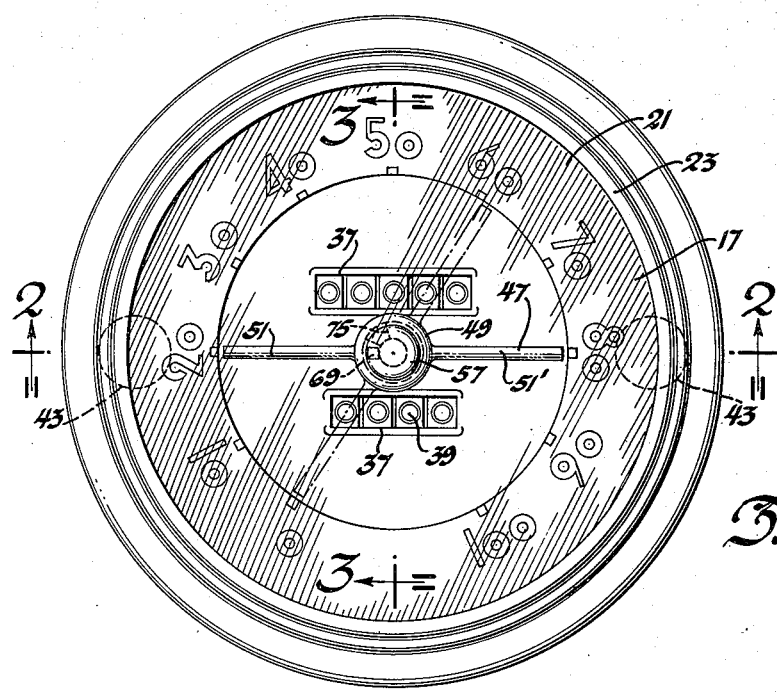
Figure 1 is a view in front elevation of a speedometer embodying this invention.
Figure 2:
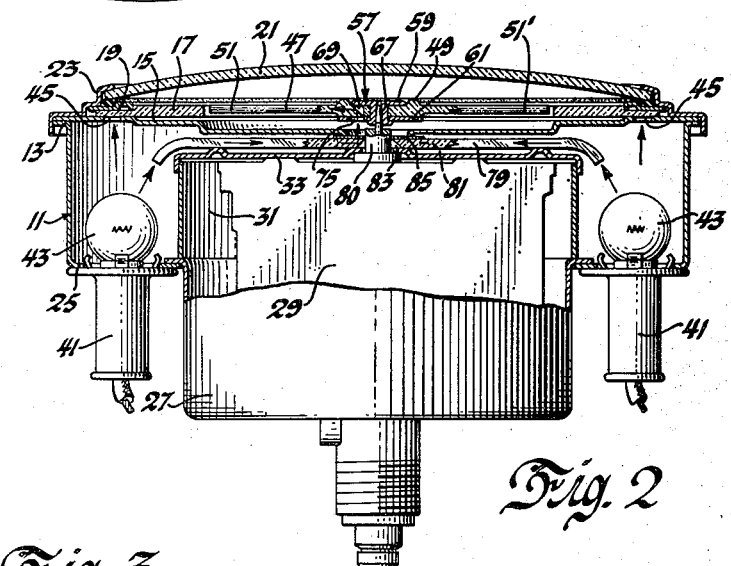
Figure 2 is a section on line 2—2 of Figure 1.
Figure 3:
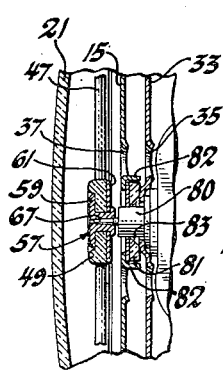
Figure 3 is a section on line 3—3 of Figure 1.
Figure 4:
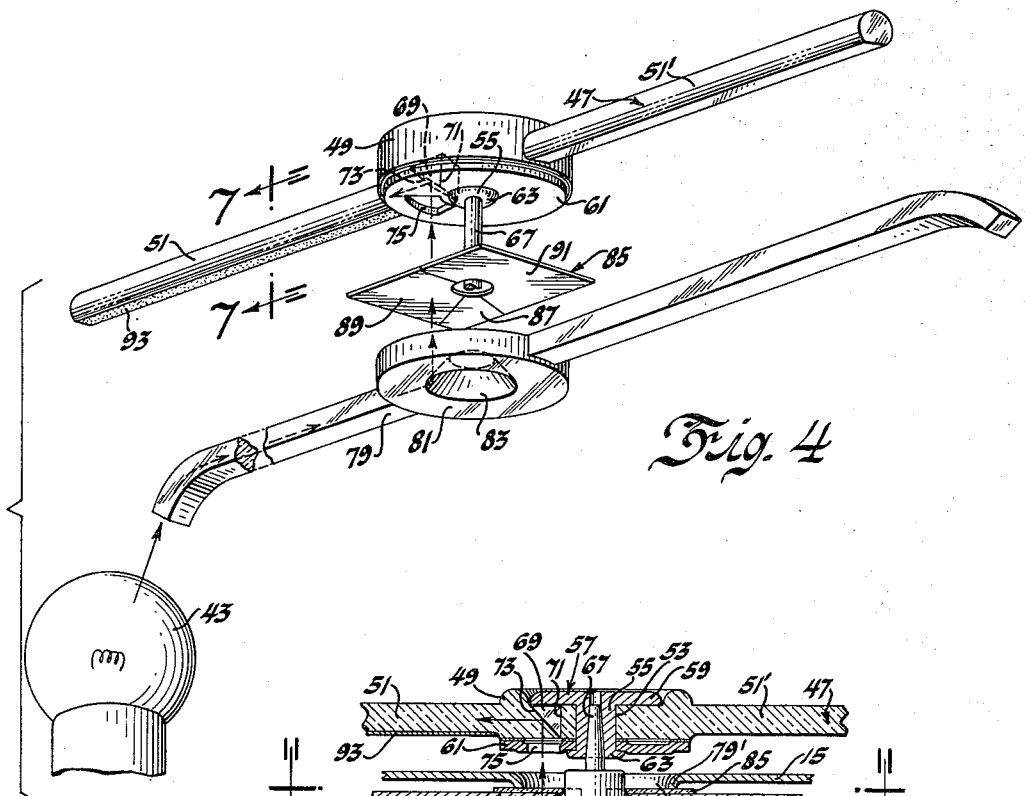
Figure 4 is a perspective of related parts in disassembled relation.
Figure 7:
Figure 7 is a section on line 7—7 of Figure 4.

Numeral 11 represents a casing having a circular wall 13. The front of the casing is covered by a metal wall 15. Seated upon wall 15 is an annular indicia carrying glass 17. A suitable retainer 19 and a glass cover 21 are held in place by a bezel 23. Glass 17 is etched or otherwise marked with speed indicating numerals as shown by Figure 1. At the side of the casing remote from the parts just described there is a flange 25 upon the inner circular margin of which is supported the casing 27 of a speedometer. Within the speedometer is a frame 29. A circular wall 31 with a cover 33 are also shown in Figure 2. The cover 33 and the wall 15 have registering openings 35 and 37 to render visible the figures 39 of an odometer which is as usual associated with the speedometer. At diametrically opposite points of the flange 25 there are suitable supporting means 41 for lamp bulbs 43. Plate 15 has openings such as 45 through which light passes to the glass plate 17. Within glass 17 the light is internally reflected and is transmitted to the observer from markings on plate 17 which may be etched or otherwise produced thereon. Cooperating with the markings on glass 17 is a pointer 47 which may be of Lucite or equivalent material. The pointer has a central hub 49 from which project diametrically opposite extensions 51, 51'. The shape of the extension is shown by Figure 7. The hub 49 has a central opening 53 whereby it is positioned upon the stem portion 55 of a bushing designated as a whole by numeral 57. The bushing 57 has a head 59 against which the hub 49 engages. The assembly is completed by a brass washer 61 against which the lower end of the stem 55 is bent over as at 63. The bushing has a tapered opening for the reception of a rotating spindle 67, the movement of which is effected by the mechanism of the speedometer.

At one side of the hub there is an opening represented by numeral 69. It has a wall 71 extending substantially vertically from the top surface to the bottom surface. Merging with wall 71 at the bottom surface is a wall 73 extending at an angle of substantially 45° therewith. Washer 61 has an opening marked 75 which is directly beneath opening 69. This construction is arranged to permit rays of light passing through opening 75 to be reflected from the angular surface 73 and to be transmitted by internal reflection through the extension 51.

Figure 5:
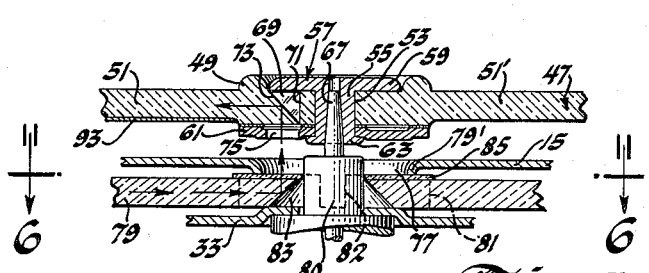
Figure 5 is a section corresponding to a part of Figure 2 but on a larger scale.
Figure 6:
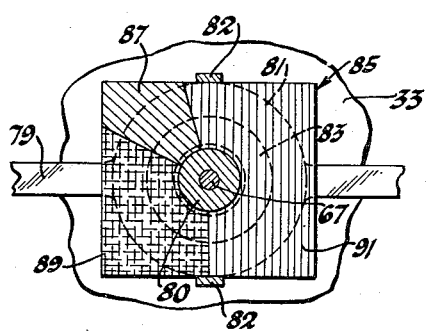
Figure 6 is a section on line 6—6 of Figure 5.

Wall 15 has a central opening 77, the marginal wall of which is downturned as indicated by numeral 79'. Between wall 33 and wall 15 is positioned an elongated Lucite light transmitting rod 79. It has a hub 81 provided with a tapered opening 83. The lower face of the hub adjacent the opening rests on surface 33. Between the upper face and the annular projection 79 is a pyralin disk 85 having color sections 87, 89 and 91 of green, amber and red, respectively. The bearing support for spindle 67 extends through the tapered opening 83 and is marked 80. The disk 85 is held from rotation by tongues 82 turned downwardly from plate 15 and engaging the sides of the disk and of the hub 81 as shown in Figure 5 and Figure 6.

The light from the bulbs 43 is transmitted through the end parts of rod 79 and is internally reflected toward the hub 81. From the conical surface of opening 83 the light is reflected in a direction parallel to the axis of the hub through the plate 85. As the pointer rotates the opening 75 in the washer registers with the green part of the disk 85 during the lower speed range for example up to about 30 miles per hour. The opening 75 registers with the amber part of the disk within the speed range having 30 and 50 miles per hour as its limits. For speeds above 50 miles per hour the opening 75 registers with the red portion of the plate. The colored light passing through opening 75 is reflected from the sloping surface 73 and is transmitted through the pointer by internal reflection. That end of the pointer 51 which is to serve in cooperation with the indicia on glass 17 is coated on its rear surface as at 93 in order to reflect light therefrom to the observer. By the construction described, not only does the pointer cooperate with the indicia to give readings in miles per hour but changes in color at 30 miles per hour and at 50 miles per hour so that the operator may be advised of the speed range within which he is driving, and may be so advised wtihout giving the instrument the attention required to determine the precise speed of travel.

I claim:

1. In a measuring instrument, a dial having indicia, a member movable to register progressively with said indicia, said movable member being adapted to transmit light by internal reflection and having a part treated to reflect light therefrom to an observer, a source of light, a means whereby light from said source to said movable member is changed in color for changed positions of movement, said last named means including a light transmitting rod having a central hub formed with a conical opening, a disk fixed in position over said opening, said disk having color selecting sections, said movable member having an apertured washer through which the light passes, said aperture being adapted to move progressively over said sections.

2. In a measuring instrument, a dial having indicia, a member movable to register progressively with said indicia, said movable member being adapted to transmit light by internal reflection and having a part treated to reflect light therefrom, a source of light, means independent of said movable means whereby light from said source is transmitted to said indicia and other means whereby light from said source is transmitted to said movable member and is subjected to changes in color to correspond with changes in position of said movable member, said other means including a fixed light transmitting element having a central part, a fixed disc having a plurality of color regions overlying said central part, said part being formed to transmit light through said disc, said movable member having a washer with an aperture progressively to overlie said color regions as the movable member moves.

3. In a measuring instrument, a dial having indicia, a member movable to register progressively with said indicia, said movable member being adapted to transmit light by internal reflection and having a part treated to reflect light therefrom, a source of light, means independent of said movable means whereby light from said source is transmitted to said indicia and other means whereby light from said source is transmitted to said movable member and is subjected to changes in color to correspond with changes in position of said movable member, said other means including a disc fixed in position and having a plurality of color regions, a washer movable with said movable member and having an aperture adapted progressively to overlie said color regions as the movable member moves, light from said source being transmitted to and through said color disc, aperture and movable member in a path independent of the path by which said indicia are illuminated.

4. In a measuring instrument, a dial having indicia, a member movable to register progressively with said indicia, said movable member being adapted to transmit light by internal reflection and having a part treated to reflect light therefrom, a source of light, means independent of said movable means whereby light from said source is transmitted to said indicia and other means whereby light from said source is transmitted to said movable member and is subjected to changes in color to correspond with changes in position of said movable member, said other means including a disc fixed in position and having a plurality of color regions, a washer movable with said movable member and having an aperture adapted progressively to overlie said color regions as the movable member moves, light from said source being transmitted to and through said color disc, aperture and movable member in a path independent of the path by which said indicia are illuminated, together able member in a path independent of the path of light between the source and the color disc, said member transmitting light by internal reflection.

5. In a measuring instrument, a dial having indicia, a member movable to register progressively with said indicia, said movable member being adapted to transmit light by internal reflection and having a part treated to reflect light therefrom, a source of light, means independent of said movable means whereby light from said source is transmitter to said indicia and other means whereby light from said source is transmitted to said movable member and is subjected to changes in color to correspond with changes in position of said movable member, said other means including a disc fixed in position and having a plurality of color regions, a washer movable with said movable member and having an aperture adapted progressively to overlie said color regions as the movable member moves, light from said source being transmitted to and through said color disc, aperture and movable member in a path independent of the path by which said indicia are illuminated, said source of light comprising spaced light bulbs, a rod having its ends adjacent said bulbs and an intermediate part underlying said color disc, said rod constructed to transmit light from said bulbs to said intermediate part by internal reflection and therefrom through said color disc and aperture.

ARTHUR W. HILLS.

CERTIFICATE OF CORRECTION.

Patent No. 2,286,737. June 16, 1942.

ARTHUR W. HILLS.

It is hereby certified that error appears in the printed specification of the above numbered patent requiring correction as follows: Page 2, second column, line 31, claim 4, strike out the syllable and words "able member in a path independent of the path" and insert instead --with a member constituting a part of the path--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.